ers: Nicholas P. Godici
United States Patent [19]
Adolfsson

[11] Patent Number: 4,880,153
[45] Date of Patent: Nov. 14, 1989

[54] DEVICE FOR USE IN EXPLOSIVE WELDING OF TWO OVERLAPPING TUBULAR OR ANNULAR ELEMENTS

[75] Inventor: Rune Adolfsson, Boras, Sweden
[73] Assignee: SKF Nova AB, Goteborg, Sweden
[21] Appl. No.: 192,328
[22] Filed: Apr. 22, 1988

[30] Foreign Application Priority Data

Apr. 29, 1987 [SE] Sweden .................................. 8701792

[51] Int. Cl.$^4$ ............................................. B23K 27/00
[52] U.S. Cl. .................................... 228/2.5; 228/107; 228/108; 228/109
[58] Field of Search .................. 228/2.5, 50, 107, 108, 228/109

[56] References Cited

U.S. PATENT DOCUMENTS

| | | | |
|---|---|---|---|
| 3,893,222 | 7/1975 | Ballinger | 228/109 |
| 3,910,084 | 10/1975 | Paton et al. | 228/2.5 |
| 4,641,775 | 2/1987 | Lande et al. | 228/2.5 |

Primary Examiner—Nicholas P. Godici
Assistant Examiner—Michael W. Starkweather
Attorney, Agent, or Firm—Eugene E. Renz, Jr.

[57] ABSTRACT

A device for use in explosive welding of two overlapping tubular or annular elements (1, 2) by an explosive charge (3). The explosive charge (3) is located in the hold of the one element (1) in front of the overlapping portion of the other element (2). The elements (1, 2) are surrounded by an annular dolly comprising a plurality of segments (4) which are individually radially movable and associated with braking means. Each segment (4) is provided with a plurality of frictional surfaces (5, 6, 7, 8) which extend radially relative to the dolly and are adjustably forcable against opposed frictional surfaces on a supporting means (9), which bridges the dolly. A device according to the invention absorbs energy efficiently and can be re-used several times without requiring adjustment or replacement of parts incorporated therein.

5 Claims, 1 Drawing Sheet

DEVICE FOR USE IN EXPLOSIVE WELDING OF TWO OVERLAPPING TUBULAR OR ANNULAR ELEMENTS

FIELD OF THE INVENTION

The present invention relates to a device for use in explosive welding of two overlapping tubular or annular elements.

BACKGROUND OF THE INVENTION

Such a prior art device is previously known by for instance U.S. Pat. No. 3,893,222. In this known arrangement a plurality of supporting segments are braked during their radial movement by means of shock-absorbing hydraulic devices or by means of devices absorbing energy by material deformation.

Hydraulic devices are of complex structure and difficult to use in rapid courses such as in explosive welding. The compressibility in hydraulic fluids and the comparatively long way a shock wave propagates in the fluid means that the shock-absorbing effect in the restriction in the flow conduit of the fluid is limited.

The method of absorbing energy by means of plastic material deformation has the disadvantage that the deformed element has to be replaced after every welding operation.

SUMMARY OF THE INVENTION

The object of the present invention is to provide a device for use in explosive welding of two overlapping tubular or annular elements wherein the above-mentioned disadvantages are avoided by means of a supporting member which has a high shock-absorbing effect when taking up explosive waves and which can be used several times without requiring adjustment and/or replacement of any element incorporated therein.

To this end, in accordance with the present invention, the energy absorbing device of the present invention comprises an annular or ring-like support member circumscribing the overlapping portions of the elements of the tubular or annular elements and a energy absorbing system comprising a plurality of segmental members which circumscribe the overlapping joint and are disposed in an annular array and a braking system comprising a series of disc-like members radially movable circumscribing the support members and including a plurality of friction discs between the radially displaceable members. By this arrangement, the radical friction absorbs all the kinetic energy. Means is provided for pressing the discs selectively to thereby provide a means for bearing the frictional force between the friction surfaces.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
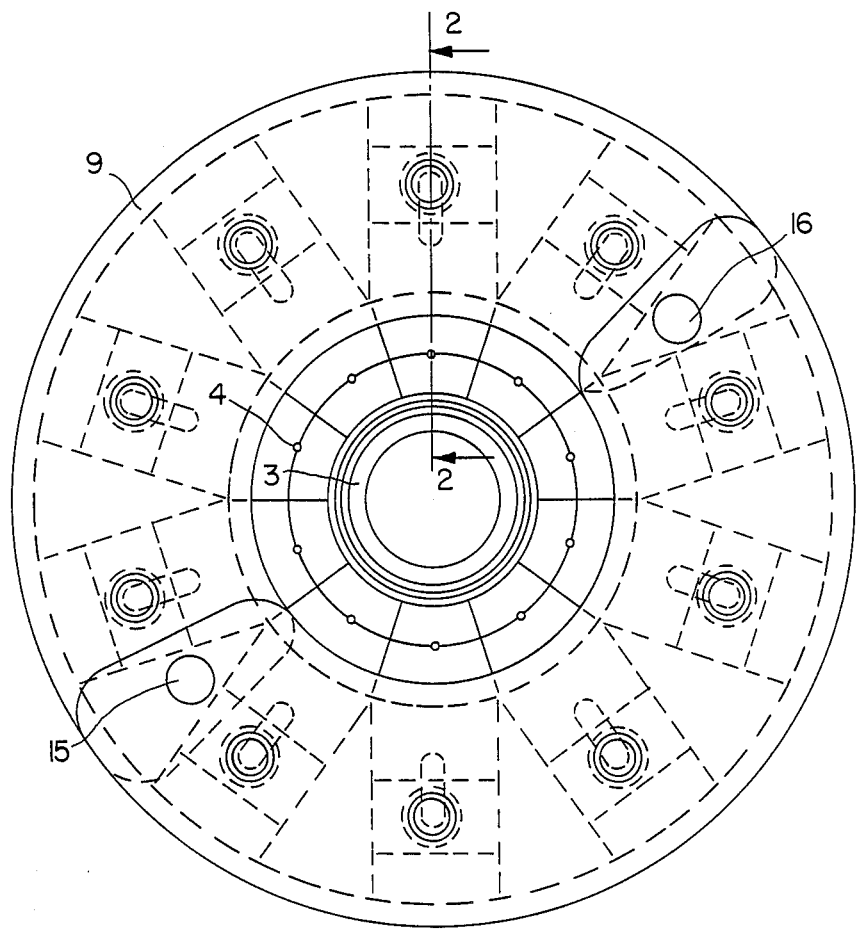
FIG. 1 is a view of one embodiment of a device according to the invention in a plane perpendicular to the axis of the elements to be welded.

Referring now the drawing and particularly to FIG. 1 thereof, there is shown a device constructed in accordance with the present invention for use in explosive welding of two tubular or annular members 1, 2, which may comprise a tube and a coupling for interconnecting two tubes. An explosive charge 3 is located in the bore of the tubular member 2. The device for absorbing the explosive energy from the charge 3 comprises, in the present instance, a plurality of segments 4 which in the illustrated embodiment are disposed in an annular array and circumscribe the outer periphery of the tubular member 1. The device further comprises an annular housing 9 of U-shaped cross section circumscribing the segments 4. The housing consists of two halves provided with a joint 15 and a coupling 16 for ease of assembly and disassembly around the joint.

Means are provided for braking the segments 4 during a welding procedure and absorbing the explosive energy generated comprising as illustrated a series of circumferentially spaced brake assemblies, one for each of the segments 4. Each brake assembly includes leg members 12 and 13 projecting from the outer surface of each segment 4 and a friction disc 14 disposed between each pair of leg members 12 and 13. The brake assembly further includes a pull rod 10 which engages through openings in the leg members 12 and 13 and disc 14 to support them in the housing 9 in the manner illustrated. In the present instance, the central disc 14 has an opening of a size slightly greater than the diameter of the pull rod 10 and the leg members 12, 13 have enlarged oval shaped openings 12a, 13a to facilitate radial displacement of the leg members and segments 4 in the housing in the manner described hereafter. Disc-like inserts 11 are provided between the side walls 14a of the housing and the leg members 12 and 13 and between the leg members and the central disc 14. This arrangement provides a plurality of radially directed friction surfaces defined by the opposing surfaces of insert member 11 secured to support means 9 and leg 12, the opposing surfaces on leg 12 and disc 14, the opposing surfaces on disc 14 and leg 13 and the opposing surfaces on leg 13 and support means 9.

Figure 2:
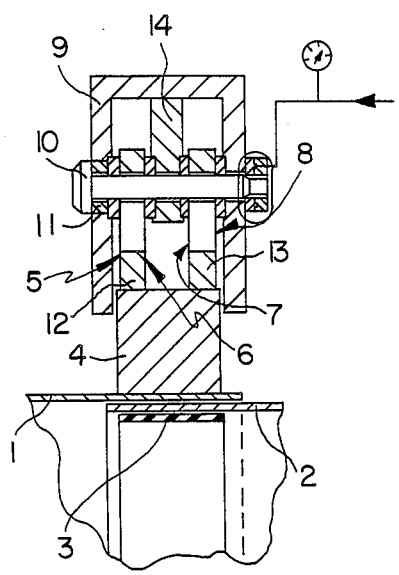
FIG. 2 is a section taken on the line A—A in FIG. 1.

Consider now a typical welding operation incorporating an explosive energy absorbing device in accordance with the present invention. Parts are initially in the position shown in FIG. 2 wherein the segments 4 circumscribe and rest against the outer periphery surface of the tubular member 1. The inner ends of the friction discs 12 and 13 bear against the outer periphery of the segments 4. When the explosive charge is detonated to effect the welding of the joint, the explosive energy transferred to the segments 4 by the explosion, is basically transformed to kinetic energy when the segments 4 are accelerated radially outwardly. This kinetic energy is transformed to friction heat when the segments 4 are braked due to the interaction of the friction surfaces between the elements comprising the brake assembly described above.

The friction force is selectively chosen so that the available retarding distance is long enough to absorb all the kinetic energy. To this end, the friction force on the friction surfaces can be adjusted by means of simply tightening the nut 10a on the pull rod 10 so that the device can be adjusted to accommodate explosive charges of different magnitude.

Figure 3:
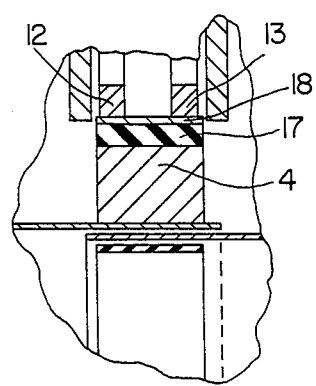
FIG. 3 is a corresponding section in an alternative embodiment of the invention.

The embodiment illustrated in FIG. 3 is similar to that described above except that in the present instance a layer 17 of an elastomeric material is provided between the outer peripheral surface of the segments 4 and the leg extensions 12 and 13 of each unit. Further the segments 4 may be interconnected by means of a resilient ring 18 on which the legs 12 and 13 are axially slidable.

Even though particular embodiments of the invention have been illustrated and described herein, it is not intended to limit the invention in changes and modifications may be made therein within the scope of the following claims. For example, the number of segments 4 can be selectively varied and the configuration of the supporting means such as the housing can be varied.

What I claim is:

1. A backup device for use in explosive welding of two telescoped cylindrical members by means of an explosive charge located inside one of said members adjacent overlapping portions of said cylindrical members said device comprising:
    (a) a relatively stationary housing surrounding said cylindrical members;
    (b) block-like support members radially displaceable within said housing;
    (c) elements radially displaceable within said housing, resting upon and displaceable with said support members, and engaging said housing which defines radial friction surfaces; and
    (d) means for selectively varying frictional forces between said friction surfaces;
    whereby, upon explosion said support members and elements are displaced radially outwardly against friction forces provided by interengaging of said frictional surfaces of said housing and elements, whereby the sole means of absorbing said explosion is the frictional forces.

2. A device according to claim 1, wherein a plurality of said first and second frictional surfaces are provided on a plurality of braking elements (12,14, 13) associated with the segment (4), said braking elements being alternatively connected to the segment (4) and the supporting means (9), respectively, and said first and second frictional surfaces being mutually radially displaceable.

3. A device according to claim 1, comprising a plurality of segments (4) mutually spaced in the circumferential direction of the elements (1, 2).

4. A device according to claim 3, wherein the segments (4) are interconnected by means of a ring (18).

5. A device according to claim 1, wherein a layer (17) of elastomeric material is provided radially between the segments (4) and the braking elements (12,13) connected to the respective segment (4).

* * * * *